L. C. HILL.
WIND SHIELD AND WIPER CONSTRUCTION.
APPLICATION FILED AUG. 16, 1915.
1,325,017.
Patented Dec. 16, 1919.
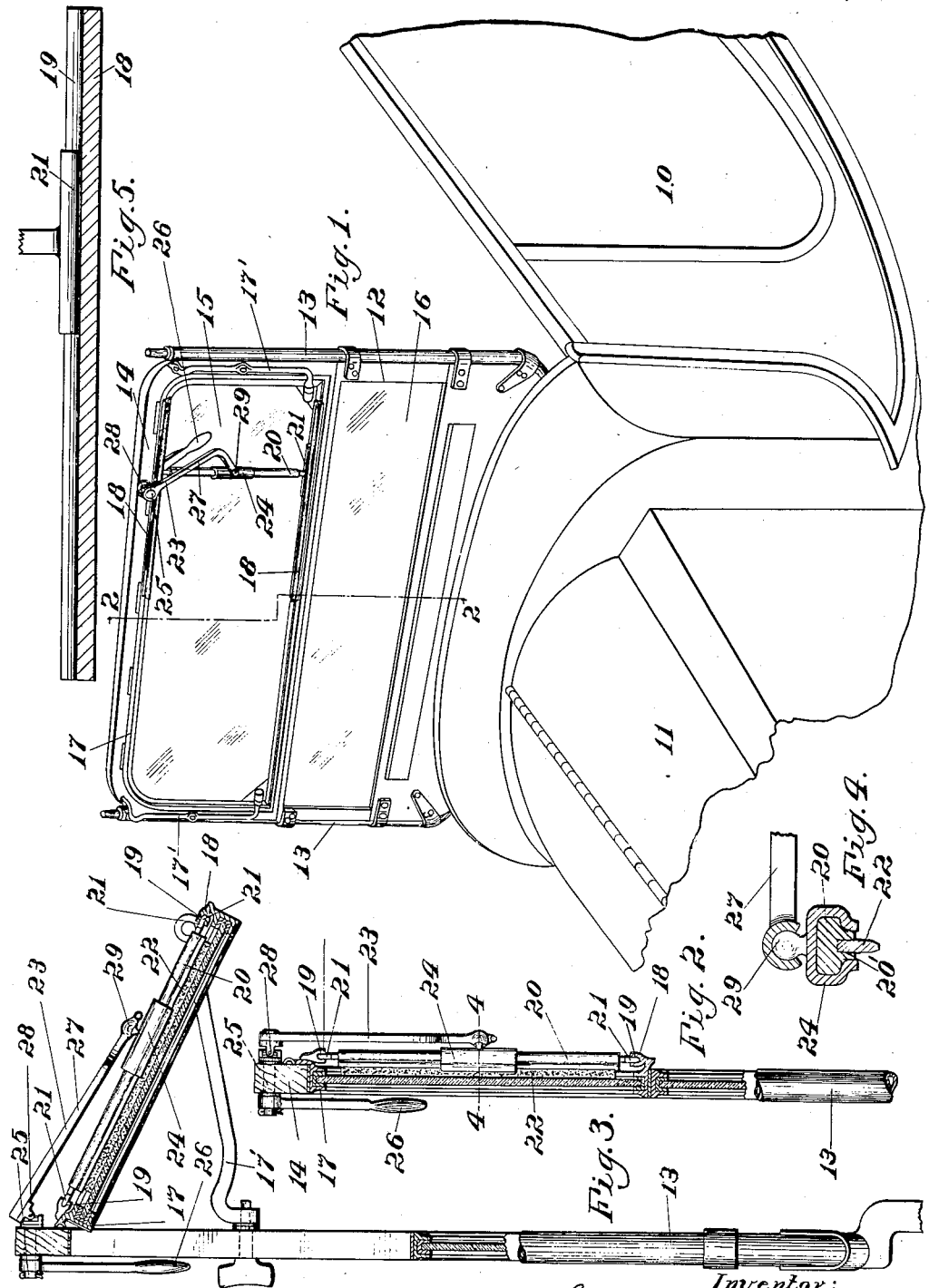

UNITED STATES PATENT OFFICE.

LEWIS CLAYTON HILL, OF DETROIT, MICHIGAN, ASSIGNOR TO PACKARD MOTOR CAR COMPANY, OF DETROIT, MICHIGAN, A CORPORATION OF MICHIGAN.

WIND-SHIELD AND WIPER CONSTRUCTION.

1,325,017.  Specification of Letters Patent.  Patented Dec. 16, 1919.

Application filed August 16, 1915. Serial No. 45,711.

*To all whom it may concern:*

Be it known that I, LEWIS CLAYTON HILL, a citizen of the United States, and resident of Detroit, Wayne county, State of Michigan, have invented certain new and useful Improvements in Wind-Shield and Wiper Constructions, of which the following is a specification.

This invention relates to improvements in motor vehicles and particularly to windshields or the like as described in the present specification and illustrated in the accompanying drawings.

The invention consists essentially of the novel arrangement and construction of parts, whereby a wiper slidably arranged in suitable guides or moldings secured adjacent to the transparent pane of the windshield, may be drawn across the face thereof by means of a flexibly jointed bell-crank.

The object of the invention is to provide a wiper of simple and durable construction, which will effectually and quickly remove any collection of moisture or the like from a portion of the transparent pane of the windshield, and which may be easily operated from the driver's seat when desired.

A further object of the invention is to minimize the dangers of motoring during inclement weather when frequent and rapid elimination of foreign matter from a portion of the glass is necessary to insure a clear vision ahead.

Other objects of the invention will be apparent from the following description taken in connection with the drawings, which form a part thereof, and in which:—

Figure 1 is a perspective view of a portion of a motor vehicle and windshield with wiper mounted thereon;

Fig. 2 is a vertical section approximately on the line 2—2 of Fig. 1;

Fig. 3 is a view similar to Fig. 2 showing the hinged sash of the windshield in raised position;

Fig. 4 is a detail view substantially on the line 4—4 of Fig. 2; and

Fig. 5 is a longitudinal sectional view through one of the wiper guides.

In the drawings, 10 represents a portion of the body of a motor vehicle and 11 represents the hood thereof. 12 is a windshield mounted in its customary position at the forward end of the body 10. The windshield 12 has supporting posts 13, frame 14 and upper and lower transparent panes 15 and 16, respectively. The upper transparent pane 15 is mounted in a sash or glass retainer 17, which is hingedly secured to the upper cross piece of the frame 14, thereby permitting the upper pane to be extended forwardly into an inclined position such as shown in Fig. 3, suitable braces 17' being provided to retain it in its extended position when desired.

A pair of moldings 18 are secured to or formed integral with the fore part of the sash 17 adjacent to the pane 15, one at the top and one at the bottom thereof in diametral relation to each other. These moldings 18 are provided with longitudinal grooves or guideways 19 for the purpose hereinafter described. A wiper comprising a retaining member 20 having a longitudinal groove 20' for a rubber or other strip 22, is arranged transversely of the transparent pane 15 and is maintained in that position by means of a pair of suitable guides 21 which are slidably arranged in the grooved moldings 18. The guides 21 are preferably fixedly attached to the retaining member 20, one across each extremity thereof, forming substantially a T at each end, whereby the wiper is retained in its normal transverse position at all times. The strip of rubber or other material 22 is suitably secured in the slot 20' of the member 20 and projects therefrom in contact throughout its length with the transparent pane 15 of the windshield 12. It will be seen that in this manner any lateral movement of the wiper will cause the rubber strip 22 to be drawn across the face of the pane 15 thereby removing any moisture or foreign matter that may have collected thereon.

Means for operating the wiper are mounted in the frame 14, and comprise a manually controlled bell-crank 23 and a split sleeve 24, which latter is slidably engaged by the member 20. The bell-crank 23 consists of a rotatable stud or shaft 25, which fits through a transverse orifice in the top of the frame 14 directly above the top molding 18 and intermediate of the length thereof, a handle 26 fixedly secured to the inner end of the stud, and an L-shaped arm 27 having one end thereof connected to the outer end of the stud by means of a universal joint 28, which may be of any suitable construction, a very common type being illustrated by the drawings herewith. The free end of the arm 27 is preferably secured to the split sleeve 24 by a ball and socket joint 29.

It will be seen that the ball and socket joint connection 29 facilitates the retention of the wiper in its transverse position when the said member is being moved or reciprocated across the face of the transparent pane 15 of the windshield. It will be observed also that the universal joint 28 permits the pane 15 to be raised into its extended position as illustrated in Fig. 3 of the drawings, without in any way interfering with the operation of the device.

It will be understood that the reciprocal motion of the wiper may be limited by varying the length of the moldings 18 and of the arm 27.

Many modification of the invention will be at once apparent and it is not intended that the invention be limited to the exact details of construction shown in the accompanying drawings.

Having thus described my invention what I claim and desire to secure by Letters Patent is:—

1. A windshield wiper comprising a wiper member adapted to slide across a windshield pane, a sleeve slidably arranged on said member, means for sliding said member comprising a rotatable shaft adapted to be mounted in the windshield frame, an arm connected to said shaft by a universal joint, and a flexible connection between said link and said sleeve.

2. A windshield wiper comprising a wiper member adapted to slide across the face of a windshield pane, a rotatable shaft adapted to be mounted in a windshield frame, an arm connected to said shaft by a universal joint, and a sleeve slidably arranged on said member, said arm and said sleeve being connected by a ball and socket joint.

3. A windshield wiper comprising a wiper member movable over a windshield pane, a sleeve slidably arranged on said member, grooved molding adapted to be attached to the windshield sash, guides rigidly secured to said member and fitting the grooves in said molding, means for sliding said member comprising a rotatable shaft adapted to be mounted in the windshield frame, a handle secured to one end of said shaft, an arm connected to the other end, and a flexible connection between said arm and said sleeve.

4. A device for cleaning windshields pivotally mounted in stationary frames, comprising a wiper adapted to be slidably mounted on the shield, an oscillatable shaft adapted to be mounted in the frame, and a flexible and sliding connection between said shaft and said wiper.

In testimony whereof I affix my signature in the presence of two witnesses.

LEWIS CLAYTON HILL.

Witnesses:
   A. K. SPEER,
   CLAIR J. COTE.